United States Patent
Persson

(10) Patent No.: US 10,559,100 B2
(45) Date of Patent: Feb. 11, 2020

(54) METHOD AND DEVICES FOR IMAGE RECONSTRUCTION

(71) Applicant: Prismatic Sensors AB, Stockholm (SE)

(72) Inventor: Mats Persson, Vasterhaninge (SE)

(73) Assignee: Prismatic Sensors AB, Stockholm (SE)

( * ) Notice: Subject to any disclaimer, the term of this patent is extended or adjusted under 35 U.S.C. 154(b) by 71 days.

(21) Appl. No.: 15/601,211

(22) Filed: May 22, 2017

(65) Prior Publication Data

US 2018/0336709 A1    Nov. 22, 2018

(51) Int. Cl.
*G06K 9/00*    (2006.01)
*G06T 11/00*    (2006.01)

(52) U.S. Cl.
CPC .................. *G06T 11/008* (2013.01)

(58) Field of Classification Search
None
See application file for complete search history.

(56) References Cited

U.S. PATENT DOCUMENTS

| | | |
|---|---|---|
| 5,390,258 A | 2/1995 | Levin |
| 6,256,367 B1 | 7/2001 | Vartanian |
| 6,754,298 B2 | 6/2004 | Fessler |
| 6,907,102 B1 | 6/2005 | Sauer et al. |
| 7,551,708 B2 | 6/2009 | Basu et al. |
| 7,885,371 B2 | 2/2011 | Thibault et al. |
| 8,923,583 B2 | 12/2014 | Thibault et al. |
| 8,929,508 B1 | 1/2015 | Alvarez |
| 9,020,230 B2 | 4/2015 | Yu et al. |
| 9,165,384 B2 | 10/2015 | Roessl et al. |
| 9,508,163 B2 | 11/2016 | Yu et al. |
| 2007/0297656 A1* | 12/2007 | DeMan ............... G01N 23/046 382/128 |

(Continued)

FOREIGN PATENT DOCUMENTS

| | | |
|---|---|---|
| EP | 2 383 702 A1 | 11/2011 |
| WO | 2016078958 A1 | 5/2016 |

(Continued)

OTHER PUBLICATIONS

Written Opinion issued in Application No. PCT/SE2018/050474, dated Sep. 7, 2018.

(Continued)

*Primary Examiner* — Hadi Akhavannik
(74) *Attorney, Agent, or Firm* — Young & Thompson

(57) ABSTRACT

A method for reconstructing image data from x-ray data measured with an imaging system having at least one photon-counting detector includes obtaining a representation of data measured by the photon-counting detector. The method also includes generating first image data based on a projection based first functional using a first algorithm, the projection based first functional being dependent on the representation of data. The method also includes updating, based on a second functional that includes a model of at least one physical effect not included in the projection based first functional, the first image data to obtain second image data. The invention also provides an image processing device configured to reconstruct image data from x-ray data measured with an imaging system including at least one photon-counting detector as well as a corresponding computer program product.

23 Claims, 8 Drawing Sheets

(56) References Cited

U.S. PATENT DOCUMENTS

| | | | | |
|---|---|---|---|---|
| 2008/0118020 A1* | 5/2008 | Thibault | ............... | G06T 11/006 |
| | | | | 378/4 |
| 2010/0091946 A1* | 4/2010 | Proksa | ................. | G06T 11/006 |
| | | | | 378/62 |
| 2010/0215230 A1 | 8/2010 | Bornefalk et al. | | |
| 2014/0126794 A1* | 5/2014 | Ahn | ..................... | G06T 11/008 |
| | | | | 382/131 |
| 2016/0120493 A1 | 5/2016 | Maeda et al. | | |

FOREIGN PATENT DOCUMENTS

| | | |
|---|---|---|
| WO | 2016148616 A1 | 9/2016 |
| WO | 2017027547 A1 | 2/2017 |
| WO | 2017193122 A1 | 11/2017 |

OTHER PUBLICATIONS

International Search Report issued in Application No. PCT/SE2018/050474, dated Sep. 7, 2018.

* cited by examiner

METHOD AND DEVICES FOR IMAGE RECONSTRUCTION

TECHNICAL FIELD

The present disclosure relates to methods, devices and computer programs for reconstructing image data based on performed x-ray measurements.

BACKGROUND

Reconstructing image data from photon-counting measurements may for example include computing or estimating a vector $a=(a_{jn})$ of basis coefficients of basis $j=1, \ldots, M_e$ and image pixel $n=1, \ldots, M_p$, based on a vector of photon counts $m=(m_{ik})$ in energy bin $i=1, \ldots, M_e$ and detector element $k=1, \ldots, M_d$.

The photon counts may for example be obtained by direct readout pf a photon-counting x-ray detector. In another example, the photon counts may be the output of a post processing scheme operating on the counts obtained by readout from a photon-counting detector. The post-processing scheme may for example involve summation, filtering, averaging, and application of correction factors or correction terms.

In another example, the image data may consist of a single image, consisting of for example one of the basis coefficients or a combination thereof. In yet another example, the image data may consists of coefficients in a non-pixelized representation of an image. For example, the elements of a may be Fourier coefficients, or wavelet coefficients, or coefficients in a representation of the image as a sum of blobs.

The vector a is, in a typical case, obtained through the optimization of a function $\Phi(a, m)$ of a and m. A function which is optimized to find a will be referred to as a functional.

Such a functional, which is a function of measured data in the projection domain, i.e. image data relating to the transmission through or photon count values after an object, will be referred to as a projection-based functional. A projection-based functional may be used for image-based material decomposition or reconstruction. In another example, a projection-based functional may be a function of line integrals of the linear attenuation coefficient or of basis coefficients along a projection line.

A functional which is instead a function of measured data or data reconstructed from measured data, in the image domain, is called an image-based functional. Such a functional can be used to perform image-based material decomposition or reconstruction.

A functional $\Phi(a, m)$ may incorporate prior information about the imaged object. For example, this prior information may be provided in the form of an edge-preserving regularizer, which penalizes rapid variations in the image. In another example, the prior information may be provided in the form of a discrepancy term penalizing a difference between the reconstructed image and a prior image.

As an example, in the absence of pulse pileup, i.e. at low photon fluence rates, the number of registered photons in energy bin k and detector element k may be modelled as Poisson distributed with mean $$\lambda_{ik} = \int_0^{kVp} N_0(E) S_i(E) \exp\left(-\sum_{j=1}^{M_b} A_{jk}(x,y) \mu_j(E)\right) dE + s_{ik} \quad (1)$$

with $A_{jk} = \int_{l_k} a_j dl$ integrated along projection ray k. Here, $N_0(E)$ is the incident spectrum, $S_i(E)$ is a weight function modeling the sensitivity of the energy bin to different incident energy levels and $s_{ik}$ is the number of expected scatter counts from the imaged object.

Eq. (1) does not model cross-talk between detector pixels, e.g. due to charge sharing, K-fluorescence or internal Compton scatter, but this can be included in the model by applying a linear operator B to the vector $\lambda$ of expected counts: $\lambda^c = B\lambda$. For example, B may be represented by a sparse matrix with elements that are nonzero only for nearest-neighboring pixels. In another example, the elements of B may decrease with increasing distance between pixels. In yet another example, B may be obtained from a Monte Carlo simulation of a pencil beam of photons impinging on one detector element and scattered into neighboring detector elements.

Furthermore, Eq. (1) does not include pile-up. The effect of pile-up can for example be modelled by letting the registered counts in one projection line be a function of the incident photons in all different energy bins in the same projection line: $\lambda_{ik}^p = f(\lambda_{1k}^c, \ldots, \lambda_{M_e,k}^c)$ where $\lambda_{ik}^p$ is the number of registered count after pile-up in energy bin i and detector element k. For example, $\lambda_{ik}^p$ may be given by a paralyzable model or a non-paralyzable detector model.

Modern CT reconstruction algorithms typically generate the reconstructed image as a maximum a posteriori (MAP) estimate of the image given the measured data. The MAP estimate may build on a complete model of the relationship between the registered counts and the image values, or it may build on a simplified model of the relationship in order to simplify the optimization algorithm. Compared to the analytical reconstruction algorithms used previously, MAP reconstruction reduces noise and allows correction for detrimental effects such as scatter and optical blur. For energy-resolving, photon-counting CT, the MAP estimator of the vector of basis coefficients in the image a is, in a typical case:

$$\hat{a} = \operatorname*{argmin}_a \sum_{i=1}^{M_e} \sum_{k=1}^{M_d} (\lambda_{ik}^p(a) - m_{ik}\lambda_{ik}^p(a)) + R(a) \quad (2)$$

where $\lambda_{ik}^p$ and $m_{ik}$ are the number of expected and registered counts, respectively, in energy bin $i=1, \ldots, M_e$ and detector element $k=1, \ldots, M_d$. $\lambda_{ik}^p$ includes the effect of cross-talk and pileup is obtained from (1) with the blur operator B and the pileup function $f$ applied. $R(a)$ is an edge-preserving regularizer, which penalizes differences between neighboring detector elements. The expression that is optimized in (2) will be referred to as an MAP functional.

If the regularization term is not included, (2) becomes a maximum likelihood (ML) estimator, and the functional to be minimized is called a maximum likelihood functional Since (2) is difficult to solve fast enough, it is common practice to replace it with a simplified penalized weighted least squares estimator. This estimator is given by minimization of a penalized weighted least squares functional, for example:

$$\hat{a} = \operatorname*{argmin}_a \sum_{j=1}^{M_b} \sum_{k=1}^{M_d} \frac{(Ta - \hat{A}_{jk})^2}{\sigma^2(\hat{A}_{jk})} + R(a) \quad (3)$$

Here, T denotes the forward ray transform operator and $\hat{A}_{jk}$ is an estimate of the line integral $A_{jk}=\int_{l_k} a_j dl$ along projection ray k. $\sigma^2(\hat{A}_{jk})$ is the variance of $\hat{A}_{jk}$. $\hat{A}_{jk}$ can be obtained from the measured counts $m_{jk}$ for each individual detector element using maximum likelihood estimation or a look-up table. Eq. (3) can be computed quickly using e.g. the iterative coordinate descent (ICD) method or the separable quadratic surrogates (SQS) method, but it gives inferior image quality compared to (2) since it builds on a simplified noise model and ignores detector cross-talk and object scatter. In particular, (3) is based on modelling the noise as Gaussian instead of Poisson, which is an approximation. There is thus a need for an algorithm that combines good image quality with fast computation time.

The publication "Multi-Material Decomposition Using Statistical Image Reconstruction for Spectral CT" by Y. Long and J. Fessler, *IEEE Trans. Med. Imag.* 33, pp. 1614-1626 (2014), relates to an iterative reconstruction method for penalized-likelihood reconstruction of material basis images. This method is initialized by a set of basis images obtained through an image-domain material decomposition method.

U.S. Pat. No. 5,390,258 relates to a method of acquiring an image from an object, wherein a set of training images is used to generate a convergent series expansion, and wherein the measured signals are used to generate a truncated series expansion of an image of the object.

U.S. Pat. No. 6,754,298 relates to a method based on a statistical model for reconstructing images from transmission measurements with high energy diversity.

U.S. Pat. No. 7,551,708 relates to a method of reconstructing material decomposed images from data from energy discriminating computed tomography detectors using the iterative coordinate descent (ICD) algorithm.

U.S. Pat. No. 9,165,384 relates to a method of image reconstruction which reconstructs a plurality of final component images of an object based on spectral projection data, wherein intermediate images are used in the reconstruction algorithm and wherein correlations between these intermediate images are taken into account in the algorithm.

U.S. Pat. No. 8,923,583 relates to a tomographic reconstruction method wherein material component images are reconstructed by optimizing a joint likelihood functional, which includes information on correlations between the component sinograms.

US patent application 2016120493A1 relates to an x-ray CT image processing method wherein a joint posterior distribution, based on a prior probability distribution, is used to estimate an x-ray absorption coefficient from measurements with different wavelengths.

U.S. Pat. No. 8,929,508 relates to a method of computing line integrals of basis coefficients through an object from x-ray photon transmission measurements by computing a first approximation to the line integrals and combining the first approximation with a correction computed from a calibration phantom.

U.S. Pat. No. 6,907,102 relates to a method of image iterative reconstruction wherein a cross-section reconstruction vector approximately matching the projection data is determined using a computed tomography model.

U.S. Pat. No. 7,885,371 relates to a method of tomographic image reconstruction wherein a first reconstruction method, which converges faster on low spatial frequencies than on high spatial frequencies, is followed by a second reconstruction method which converges faster on high spatial frequencies than on low spatial frequencies.

U.S. Pat. No. 9,508,163 relates to a method of iterative tomographic reconstruction wherein each iteration of an outer loop includes iterative processing of an inner loop.

U.S. Pat. No. 9,020,230 relates to a reconstruction method employing an outer iteration loop and an inner iteration loop, wherein the inner iteration loop calculates a preconditioner used by the outer loop.

U.S. Pat. No. 6,256,367 relates to a method of correcting for artifacts due to scatter CT images by Monte Carlo simulating photon scatter and subtracting the simulated photon energy from the measured projection data.

There is, however, an ongoing need for a fast reconstruction algorithm that gives good image quality.

SUMMARY

It is an object of the proposed technology to provide methods and corresponding devices and computer programs that yields reconstructed images of high quality fast.

It is a particular object to provide a method for reconstructing image data based on measurements performed by an x-ray system.

It is another particular object to provide an image processing device for reconstructing image data based on measurements performed by an x-ray system.

It is yet another object to provide a computer program for reconstructing image data based on measurements performed by an x-ray system.

According to a first aspect there is provided a method of reconstructing image data from x-ray data measured with an imaging system comprising at least one photon-counting detector. The method comprises the step of obtaining a representation of data measured by the photon-counting detector. The method also comprises the step of generating first image data based on a projection based first functional using a first algorithm, the projection based first functional being dependent on the representation of data. The method further comprises the step of updating, based on a second functional that includes a model of at least one physical effect not included in the projection based first functional, the first image data to obtain second image data.

According to a second aspect there is provided an image processing device for reconstructing image data from x-ray data measured with an imaging system comprising at least one photon-counting detector. The image processing device is configured to obtain a representation of data measured by the photon-counting detector. The image processing device is also configured to generate first image data based on a projection based first functional using a first algorithm, the projection based first functional being dependent on the representation of data. The image processing device is also configured to update, based on a second functional that includes a model of at least one physical effect not included in the projection based first functional, the first image data to obtain second image data.

According to a third aspect there is provided a computer program adapted to reconstruct image data from x-ray data measured with an imaging system comprising at least one photon-counting detector and comprises instructions, which when executed by at least one processor, cause the processor(s) to:
  read a representation of data measured by a photon-counting detector of an x-ray imaging system;
  generate first image data based on a first functional using a first algorithm, the first functional being dependent on the representation of data;

update, based on a second functional that includes a model of at least one physical effect not included in the first functional, the first image data to obtain second image data.

According to a fourth aspect there is provided a computer program product comprising the computer program of the fourth aspect.

The proposed technology provides for a fast algorithm that yields high quality image data. The provided algorithm has the virtue of being able to generate an image that takes several physical effects into account, such as non-Gaussian statistics, detector cross-talk, pile-up and optical blur. The provided algorithm is also fast since it builds on solving a simplified optimization problem as a first step and then correcting the resulting first image with a few computationally inexpensive steps.

DETAILED DESCRIPTION

Figure 1:
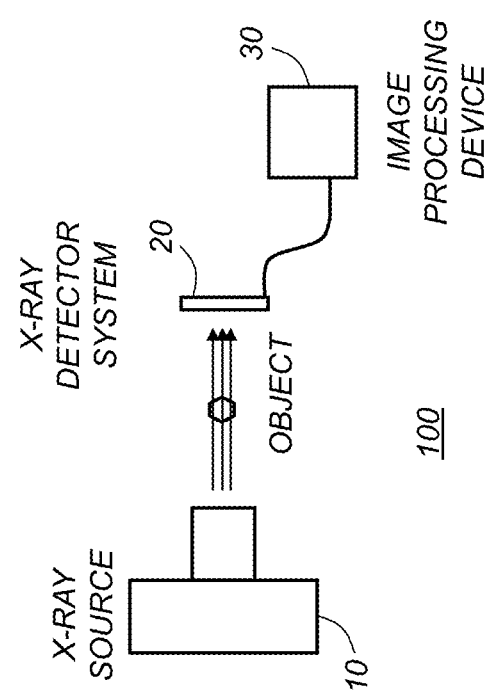
FIG. 1 is a schematic diagram illustrating an x-ray imaging system according to prior art.

It may be useful to begin with a brief overview of an illustrative overall x-ray imaging system, with reference to FIG. 1. In this non-limiting example, the x-ray imaging system 100 basically comprises an x-ray source 10, an x-ray detector system 20 and an associated image processing device 30. In general, the x-ray detector system 20 is configured for registering radiation from the x-ray source 10 that may have been focused by optional x-ray optics and passed an object or subject or part thereof. The x-ray detector system 20 is connectable to the image processing device 30 via suitable analog processing and read-out electronics (which may be integrated in the x-ray detector system 20) to enable image processing and/or image reconstruction by the image processing device 30.

Figure 2:
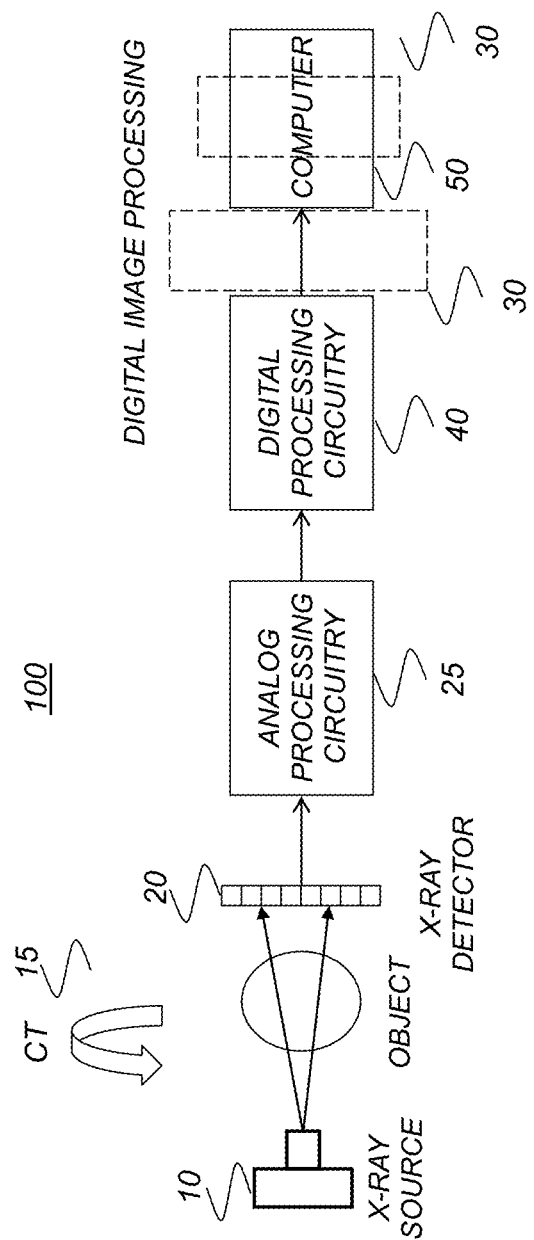
FIG. 2 is a schematic diagram illustrating an alternative version of an x-ray imaging system according to prior art.

As illustrated in FIG. 2, another example of an x-ray imaging system 100 comprises an x-ray source 10, which emits x-rays; an x-ray detector system 20, which detects the x-rays after they have passed through the object; analog processing circuitry 25, which processes the raw electrical signal from the detector and digitizes it; digital processing circuitry 40 which may carry out further processing operations on the measured data such as applying corrections, storing it temporarily, or filtering; and a computer 50 which stores the processed data and may perform further post-processing and/or image reconstruction.

A challenge for x-ray imaging detectors is to extract maximum information from the detected x-rays to provide input to an image of an object or subject where the object or subject is depicted in terms of density, composition and structure. It is still common to use film-screen as detector but most commonly the detectors today provide a digital image.

Modern x-ray detectors normally need to convert the incident x-rays into electrons, this typically takes place through photo absorption or through Compton interaction and the resulting electrons are usually creating secondary visible light until its energy is lost and this light is in turn detected by a photo-sensitive material. There are also detectors, which are based on semiconductors and in this case the electrons created by the x-ray are creating electric charge in terms of electron-hole pairs which are collected through an applied electric field.

In general, the x-ray photons, including also photons after Compton scattering, are converted to electron-hole pairs inside a semiconductor detector, where the number of electron-hole pairs is generally proportional to the photon energy. The electrons and holes are then drifting towards the detector electrodes, then leaving the detector. During this drift, the electrons and holes induce an electrical current in the electrode, a current which may be measured, e.g. through a Charge Sensitive Amplifier (CSA), followed by a Shaping Filter (SF).

As the number of electrons and holes from one x-ray event is proportional to the x-ray energy, the total charge in one induced current pulse is proportional to this energy. The current pulse is amplified in the CSA and then filtered by the SF filter. By choosing an appropriate shaping time of the SF filter, the pulse amplitude after filtering is proportional to the total charge in the current pulse, and therefore proportional to the x-ray energy. Following the SF filter, the pulse amplitude is measured by comparing its value with one or several threshold values (Thr) in one or more comparators (COMP), and counters are introduced by which the number of cases when a pulse is larger than the threshold value may be recorded. In this way it is possible to count and/or record the number of X-ray photons with an energy exceeding an energy corresponding to respective threshold value (Thr) which has been detected within a certain time frame.

When using several different threshold values, a so-called energy-discriminating detector is obtained, in which the detected photons can be sorted into energy bins corresponding to the various threshold values. Sometimes, this type of detector is also referred to as a multi-bin detector.

In general, the energy information allows for new kinds of images to be created, where new information is available and image artifacts inherent to conventional technology can be removed.

In other words, for an energy-discriminating detector, the pulse heights are compared to a number of programmable thresholds in the comparators and classified according to pulse-height, which in turn is proportional to energy.

Having briefly described how photon counting detectors work and how the measurements may be used to reconstruct images, in what follows there will be described methods and devices that provides improved image reconstruction features.

The inventors have appreciated that the optimum of a first, simplified functional, for example a penalized weighted least squares functional, may be a good approximation to the optimum of a second, more complicated functional.

The inventors have further appreciated that a projection-based functional is able to model the image acquisition more accurately than an image-based functional. Therefore, it is preferable to let the first, simplified functional, be a penalized weighted least squares functional.

The publication "Multi-Material Decomposition Using Statistical Image Reconstruction for Spectral CT" by Y. Long and J. Fessler, *IEEE Trans. Med. Imag.* 33, pp. 1614-1626 (2014), relates to a method of using a set of basis images resulting from image-based material decomposition to initialize an optimization of a functional which contains a more complete model of the imaging system, including a model of Poisson noise. However, the method of the publication does not include using basis images resulting from the optimization of a projection-based functional to initialize the optimization.

Figure 3:
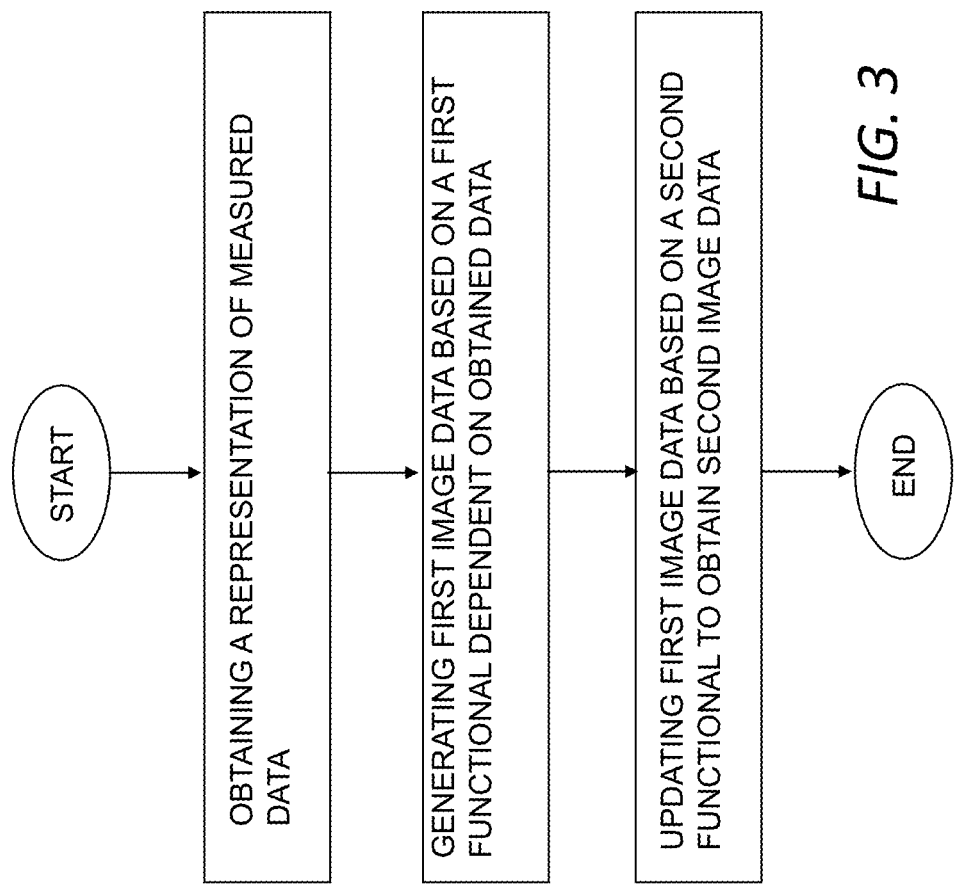
FIG. 3 is a schematic flow diagram illustrating a method for reconstructing image data according to the proposed technology.

We disclose a novel method of solving the image reconstruction problem. To this end there is provided a method of reconstructing image data from x-ray data measured with an imaging system comprising at least one photon-counting detector. The method comprises the step of obtaining S1 a representation of data measured by the photon-counting detector. The method also comprises the step of generating S2 first image data based on a projection based first functional using a first algorithm, the projection based first functional being dependent on the representation of data. The method further comprises the step S3 of updating, based on a second functional that includes a model of at least one physical effect not included in the projection based first functional, the first image data to obtain second image data. The method is schematically illustrated in the flow diagram of FIG. 3.

The proposed method may for example be based on first solving a simpler problem, e.g., the problem of solving the functional defined by formula (3) above, by using a first optimization algorithm and then applying at least one update so that the solution becomes a better approximation of the full MAP problem defined by formula (2) above. In general, it builds on obtaining first image data by optimizing a first, simplified functional and subsequently applying one or more update steps so that the resulting image data is a better approximation than the first image data to the optimum of a second functional, which models additional physical effects not modelled by the first functional.

Put in slightly different words, the proposed technology provides a method for reconstructing images based on measurements performed by a photon counting detector. The measurements are provided, in a step S1 as input in order to be able to generate, in a step S2, image data based on a first projection based functional. The measurement data is provided in a representation that is suitable for computing the first functional. The measurement data may thus be provided in a pre-processed form, i.e. the raw measurement data may have been subject to pre-processing or pre-handling whereby a particular measurement data representation is obtained. The particular representation should be chosen so as to obtain a form that is suitable for use as input in the first functional in order to generate the first image data. The measurement data may in particular be tomographic x-ray data measured with an imaging system comprising at least one photon-counting detector. The method also comprises to update the generated first image data in order to obtain second image data. The update may be done in several ways which will be described below. The updates are however all done based on a second functional that provides a more detailed model of the physical effects present during x-ray detection. A particular example illustrating the differences between the first functional and a second, more detailed, functional is given by the functional defined by formula (3) and the functional defined by formula (2) provided earlier.

According to a particular embodiment of the proposed method, the step S2 of generating first image data might comprise using a first algorithm on the first functional where the first functional is a penalized weighted least squares functional.

According to another particular embodiment of the proposed method, the step S2 of generating first image data comprises using a first algorithm on the first functional where the first functional is a maximum likelihood or a maximum a posteriori functional.

Still another embodiment provides a method wherein the first algorithm, also referred to as a first optimization algorithm, is a Newton method, an iterative coordinate descent method, a separable quadratic surrogates method, an expectation maximization method, a conjugate gradient method, an ordered subset method, or a combination of a plurality of the methods.

In this way, the optimum of the simplified functional, which is easy to compute, can be corrected in one or a small number of update steps, to yield an approximate optimum of the second functional. In this way, a large number of iterations of an optimization algorithm converging to the optimum of the second functional, which could be computationally expensive, is avoided.

Yet another embodiment provides a method where the update is performed in a first manner utilizing a particular term from the second functional. This embodiment provides a method wherein the step S3 of updating the first image data to obtain second image data comprises to perform an image updating algorithm on the first functional when at least one term from the second functional has been added to the first functional, the at least one term providing a model of at least one physical effect not included in the first functional.

Stated slightly differently, the first functional may be used in its original form, see e.g. the functional representation provided by formula (3) above, to yield first image data a. This first image data a may then be updated by adding a particular term from the second functional, see e.g. functional representation provided by formula (3) for a particular second functional, that provides a model of a physical effect not included in the first functional. This particular term may be seen as a perturbation of the first functional, i.e. the first functional is perturbed by the particular term from the second functional. In this way it will be possible to update the first image data a by inserting it into the perturbed first functional and perform an image updating algorithm in order to yield second image data a*. The physical effects modelled by the particular term may include a model of the Poisson noise, pile-up, optical blur due to the finite size of the detector and focal spot, or detector cross-talk. It is possible to add several distinct terms from the second functional to the first functional. The different terms may model several different physical effects. The image updating algorithm used for the initial first functional, e.g. the non-perturbed first functional, may be a different image updating algorithm to the image updating algorithm that is used to obtain updated image data by applying it to the perturbed first functional. This embodiment provides a way for updating the image data by using a particular term, or particular terms, from the second functional.

The disclosed method works best if the second functional can be regarded as a small perturbation of the simplified functional. This is often the case if the second functional, for example, is based on a representation of one or several physical effects that are not modelled by the simplified functional. The physical effects may include a model of the Poisson noise, pile-up, optical blur due to the finite size of the detector and focal spot, or detector cross-talk.

According to a possible embodiment of the proposed technology there is provided a method where said image updating algorithm is performed utilizing a series expansion of the optimum of the perturbed first functional around the first image data with respect to at least one parameter determining the magnitude of at least one particular term from the second functional. To this end there is provided a method wherein the step of updating the first image data comprises to perform a series expansion of at the optimum of the perturbed first functional around the first image data with respect to at least one parameter describing the magnitude of at least one particular term in the second functional and compute, based on the series expansion, updated image data where at least one term in the series expansion of the optimum has been added to the first image data to thereby obtain second image data. Preferably the update comprises the addition of at least one term in a series expansion that converges to an optimum of the second functional.

In different words, beside the fact that it is possible to add several distinct terms from the second functional to the first functional, it is also possible to add one or several image data correction terms obtained from a series expansion representing the influence of one or several of the terms from the second functional on the optimum of the perturbed first functional, to the first image data. Calculation of the image data correction terms from the series expansion may be done through direct application of an analytical formula, or by solving an equation by an iterative method. The series expansion may for example be a Taylor expansion around a perturbation strength parameter d.

In the present disclosure an optimum of a functional refers to either a maximum point or a minimum point. A maximum point of a functional L is an input data vector a of the functional L such that the value L(a) of the functional evaluated with the data vector as input is larger than the value L(a') of the functional evaluated for any other input data vector a' in a set of permissible input data vectors. Similarly, a minimum point of a functional L is an input data vector a of the functional L such that the value L(a) of the functional evaluated with the data vector as input is smaller than the value L(a') of the functional evaluated for any other input data vector a' in a set of permissible input data vectors. There are two types of functionals used in image reconstruction: functionals that should be maximized and functionals that should be minimized. Which of these two categories a given functional belongs to can be seen on the mathematical formulation of the functional. The two types of functionals are closely related, since a functional that should be maximized can be turned into a functional that should be minimized by multiplying it with −1, and vice versa. Optimizing a functional amounts to either maximizing it, in case it is a functional that should be maximized, or minimizing it, in case it is a functional that should be minimized. In practice, the optimum may not be possible to calculate exactly, so that optimization in a practical situation may amount to calculating an approximation to the minimum point or to the maximum point.

By way of example, if $\Phi(a, m)$ denotes the target functional to be minimized in (2) and $\Phi^0(a, m)$ the target functional in (3), $\Phi(a, m)$ can be expressed as $\Phi^0(a, m)+d\Phi^1(a, m)$ where d is a perturbation strength parameter. If $a=h(d, m)$ denotes the mapping from registered data m to an estimated set of basis images a, $h(d, m)$ can be expanded in a Taylor series in d around $d=0$. For example, to first order in d, $h(d, m)=h^0(m)+d \cdot h^1(m)$, where the image correction term $h^1$ is given by $$H_{\Phi^0} h^1(m) = \nabla_a \Phi^1(a,m)|_{a=h^0(m)} \quad (4)$$

where $H_{\Phi^0}$ is the Hessian matrix of $\Phi^0$ with respect to a. Solving this quadratic equation for $h^1$ typically requires an amount of computational power comparable to two iterations with an iterative method for solving (3). Since direct iterative optimization of (2) may require hundreds of iterations, this can be very time-saving. If necessary, higher order corrections can be calculated similarly.

It should be noted that the above mentioned perturbation strength parameter d in certain embodiments may be set to one after the Taylor expansion has been performed. In particular cases it is however not essential that the computation of the first functional, when perturbed by terms from the second functional, yields a converging solution. The first few terms that are computed may yield a good approximation. In the latter cases it may not be necessary to set d to one.

For example, the proposed method can combine the ability of the full MAP method (2) to model Poisson noise, detector cross-talk and object scatter with the speed of the penalized weighted least squares problem (3). The fact that a well-established reconstruction method may be used as a part of the proposed method also facilitates its introduction in clinical CT scanners.

The second algorithm referred to above may optionally be a Newton method, an iterative coordinate descent method, a separable quadratic surrogates method, an expectation maximization method, a conjugate gradient method, an ordered subset method, or a combination of a plurality of the methods.

In another aspect of the invention, the image data can be updated in several steps, such that the result of a first set of updates with a first update strategy is used as input to a second set of updates with a second update strategy. The above proposed algorithms may thereby be combined sequentially.

According to a particular embodiment of the proposed technology there is provided a method that can be used to select particular image data that can be used as reconstructed image data. To this end there is provided a method that also comprises the steps of:
computing S4 the value of the second functional when the second functional:
a) depends on the first image data, and
b) depends on the second image data; and
comparing S5 the computed values, and
selecting S6, based on the comparison, image data to be used as reconstructed image data.

One purpose of this particular embodiment is to select the particular image data that best approximates the optimum of the second functional. A particular criteria that can be used where e.g. the second image data is selected if it is considered a better approximation to, e.g., the optimum of the second functional than the first image data.

Consider the following non-limiting example of the proposed embodiment. At first a representation of the measured data is obtained in a step S1. In a step S2 first image data is generated based on a projection based first functional, denoted L1 using a first algorithm and the obtained representation of data. At this point in the procedure first data, referred to as a, is obtained. The obtained data, a, may now be updated based on the second functional, referred to as L2. The second functional may be written as $$L2=L1+\Delta L,$$

Where the first functional L1 does not contain the terms used as perturbations for the first functional, i.e. the perturbation terms are comprised in ΔL. ΔL includes terms that model of at least one physical effect that is not included in the projection based first functional. As described earlier, there are now several distinct ways to update the first image data in order to obtain second image data. One particular way is to add one or several terms comprised in $\Delta L$ to the first functional in order to get L1+$\Delta L$. Instead of including the complete difference between the first functional and the second functional in the correction term $\Delta L$, one possibility is to expand one or several of the terms comprised in $\Delta L$ in a Taylor series and add at least one of the terms to L1.

This perturbed first functional may now be subject to an algorithm, either different from the one used to generate first image data or the same algorithm, whereby second image data, referred to as a*, is obtained by updating the first image data in the step S3. This second algorithm may exemplarily be an iterative algorithm. In another aspect of the invention, the second algorithm may include Taylor expanding the optimum of the perturbed first functional, viewed as a function of the input data, around the first image data a. The Taylor expansion is thereby made with respect to a parameter d determining the magnitude of the perturbation term. From this Taylor expansion, one or several correction term can be computed, which are applied to a and thereby yield a*.

Regardless of which particular way that is used to incorporate the perturbation/term, second image data will be obtained by applying an algorithm to the perturbed first functional. At this stage in the procedure first and second image data, a and a*, is obtained. The method now proceeds with the aim of determining which particular image data of the first and second image data that best approximates the second functional. That is, the method proceeds and determines which of the first and second image data that best approximates the complete solution to the second functional. This may also be seen as determining which of the first and second image data that converges to a solution to the second functional. This may be obtained by first computing, in a step S4, the value of the second functional L2 when the second functional depends on the first image data, i.e. L2 (a) and when it depends on the second image data, i.e. L2 (a*). After this the computed values L2 (a) and L2 (a*) are compared in a step S5 in order to select, in a step S6, image data to be used as reconstructed image data based on the comparison. It should here be noted that a functional that is evaluated based on a particular image data, which might be a vector or even a vector valued function, provides a scalar as output. The purpose of the comparing step and selecting step is to select the particular image data that best approximates a solution to the second functional. To clarify what is meant by a better approximation in the present case, a first image data vector $a_1$ is a better approximation than a second image data vector $a_2$ to a third image data vector $a_3$ if a mathematical measure of the discrepancy between $a_1$ and $a_2$ is less than the mathematical measure of the discrepancy between $a_2$ and $a_3$. A mathematical measure of the discrepancy between a and a' may for example be an Euclidian norm of a–a', or a weighted Euclidean norm of a–a', or an $L^p$ norm of a–a the absolute value of the largest element of a–a', or the Kullback-Leibler divergence between a–a'.

According to a particular version of the above mentioned embodiment the selected image data may be used as input in an updating scheme for updating the reconstructed image data.

According to this aspect of the invention, the image data can be updated in several steps, such that the result of a first set of updates with a first update strategy is used as input to a second set of updates with a second update strategy. The above proposed algorithms may thereby be combined sequentially.

An optional embodiment of the methods described above provides a method wherein the step of computing the value of the second functional comprises to compute an estimate of the value second functional by performing at least one step in an algorithm.

That is, the first image data and the second image data may be fed into the second functional and be subjected to one or several steps in an algorithm in order to yield an approximation of the value of the second functional. The particular image data to be used as reconstructed image data may then be selected, in step S6, based on the obtained approximation.

A particular version of the proposed embodiment provides a wherein the step S6 of selecting the image data to be used as input comprises to select the image data that yields the lowest or highest value for the second functional. With the value of the second functional is also intended an approximate value of the second functional that may have been obtained by performing one or several steps of an algorithm applied to the second functional.

In another embodiment of the invention, the at least one update of the first image data may be one or several iteration steps of a second optimization algorithm, such that the output of the algorithm converges to the optimum of the second functional. For example, the steps of the second optimization algorithm may be more computationally heavy than the first algorithm, so that it is preferable to use the first algorithm to optimize the first functional and one or a few steps of the second algorithm to update the image data, thereby approximating the optimum of the second functional.

For example, the second optimization algorithm may be a Newton method, which is may be computationally expensive but still possible to use for a small number of iterations.

In a preferred embodiment, the at least one update comprises the first part of a systematic update scheme the result of which, if the updates are applied repeatedly, converges to the solution of the second functional. With a systematic update scheme is meant a set of rules which allows calculation of a series of updated sets of image data, from a first set of image data and, possibly, also from the result of applying previous updates to a first set of image data.

Such an update scheme is different from ad-hoc corrections since it will converge to the statistically optimal image estimator provided that the second functional, for example the full problem (2) can be regarded as a small perturbation of the first functional, for example (3).

The physical effect modelled by the second functional may in all of the described embodiments relate to one of the following, or a combination thereof: Poisson noise statistics, optical blur, pile-up, detector element cross-talk and object scatter.

According to a preferred embodiment of the proposed method there is provided a method wherein the first image data comprises at least one basis material image.

This particular embodiment utilizes a technique enabled by energy-resolved x-ray imaging. That is, a technique commonly referred to as basis material decomposition. This technique utilizes the fact that all substances built up from elements with low atomic number, such as human tissue, have linear attenuation coefficients $\mu(E)$ whose energy dependence can be expressed, to a good approximation, as a linear combination of two (or more) basis functions:

$$\mu(E)=a_1 f_1(E)+a_2 f_2(E).$$

where $f_i$ are the basis functions and $a_i$ are the corresponding basis coefficients. If there is one or more element in the imaged volume with high atomic number, high enough for a k-absorption edge to be present in the energy range used for the imaging, one basis function must be added for each such element. In the field of medical imaging, such k-edge elements can typically be iodine or gadolinium, substances that are used as contrast agents.

Basis material decomposition has been described in Alvarez and Macovski, "Energy-selective reconstructions in X-ray computerised tomography", Phys. Med. Biol. 21, 733. In basis material decomposition, the line integral $A_i$ of each of the basis coefficients $a_i$ is inferred from the measured data in each projection ray 1 from the source to a detector element. The line integral $A_i$ can be expressed as:

$$A_i = \int_l a_i dl \text{ for } i=1, \ldots, N,$$

where N is the number of basis functions. In one implementation, basis material decomposition is accomplished by first expressing the expected registered number of counts in each energy bin as a function of $A_i$. Typically, such a function may take the form:

$$\lambda_i = \int_{E=0}^{\infty} S_i(E) \exp\left(-\sum_{j=1}^{N} A_j f_j(E)\right) dE$$

Here, $\lambda_i$ is the expected number of counts in energy bin i, E is the energy, $S_i$ is a response function which depends on the spectrum shape incident on the imaged object, the quantum efficiency of the detector and the sensitivity of energy bin i to x-rays with energy E. Even though the term "energy bin" is most commonly used for photon-counting detectors, this formula can also describe other energy resolving x-ray systems such as multi-layer detectors or kVp switching sources.

Then, the maximum likelihood method may be used to estimate $A_i$ under the assumption that the number of counts in each bin is a Poisson distributed random variable. This is accomplished by minimizing the negative log-likelihood function, see Roessl and Proksa, K-edge imaging in x-ray computed tomography using multi-bin photon counting detectors, Phys. Med. Biol. 52 (2007), 4679-4696:

$$\hat{A}_1, \ldots, \hat{A}_N = \operatorname*{argmin}_{A_1,\ldots,A_N} \sum_{i=1}^{M_b} \lambda_i(A_1, \ldots, A_N) - m_i \ln \lambda_i(A_1, \ldots, A_N)$$

where $m_i$ is the number of measured counts in energy bin i and $M_b$ is the number of energy bins.

From the line integrals A, a tomographic reconstruction to obtain the basis coefficients $a_i$ may be performed. This procedural step may be regarded as a separate tomographic reconstruction, or may alternatively be seen as part of the overall basis decomposition.

When the resulting estimated basis coefficient line integral $\hat{A}_i$ for each projection line is arranged into an image matrix, the result is a material specific projection image, also called a basis image, for each basis i. This basis image can either be viewed directly (e.g. in projection x-ray imaging) or taken as input to a reconstruction algorithm to form maps of basis coefficients $a_i$ inside the object (e.g. in CT). Anyway, the result of a basis decomposition can be regarded as one or more basis image representations, such as the basis coefficient line integrals or the basis coefficients themselves.

According to a particular example of the proposed technology the first image data may be obtained by applying a first optimization algorithm on the first functional. The first optimization algorithm is a Newton method, an iterative coordinate descent method, a separable quadratic surrogates method, an expectation maximization method, a conjugate gradient method, an ordered subset method, or a combination of a plurality of the methods. The update of the first image data to obtain second image data may in the same example be obtained by the application of at least one iteration of a second iterative method optimizing the second functional. The second iterative method is a Newton method, an iterative coordinate descent method, a separable quadratic surrogates method, an expectation maximization method, a conjugate gradient method, an ordered subset method, or a combination of a plurality of the methods.

The update of the first image data may moreover comprise the addition of at least one term in a series expansion converging to an optimum of the second functional.

In another example the second optimization method may be an iterative coordinate descent method, a separable quadratic surrogates method (also called a separable paraboloidal surrogates method), an expectation maximization method, a conjugate gradient method, an ordered subset method, or a combination of these.

In another embodiment of the invention, the full Poisson noise model can be included in the optimization problem that is solved iteratively, using for example a pixel-wise separable quadratic surrogates (PWSQS) method similar to that described in Y. Long and J. Fessler, "Multi-Material Decomposition Using Statistical Image Reconstruction for Spectral CT", IEEE Trans. Med. Imag. 33, pp. 1614-1626 (2014). This may be beneficial in situations where the Poisson noise model differs so much from the Gaussian noise model that an inconveniently large number of updates to the first image data are needed. The series expansion method is then used to correct for, for example, detector cross-talk, pile-up and object scatter.

In yet another embodiment of the invention, it may be that the detector cross-talk alters the image so much that a few terms in the series expansion are insufficient to correct for it. In this case, the detector cross-talk must be included in the optimization of the first functional by including a blur operator in (3), while the series expansion is used for taking the Poisson noise model and object scatter into account. The initial optimization may for example be made using an optimization algorithm based on the separable quadratic surrogates method.

In another embodiment of the invention, both Poisson noise and detector cross-talk may be represented in the optimization of the first functional, whereas object scatter, which is too expensive to compute in each iteration, can be corrected for using the series expansion method.

To facilitate the understanding of the propose technology below will follow some illustrative examples of the described method.

Figure 4:
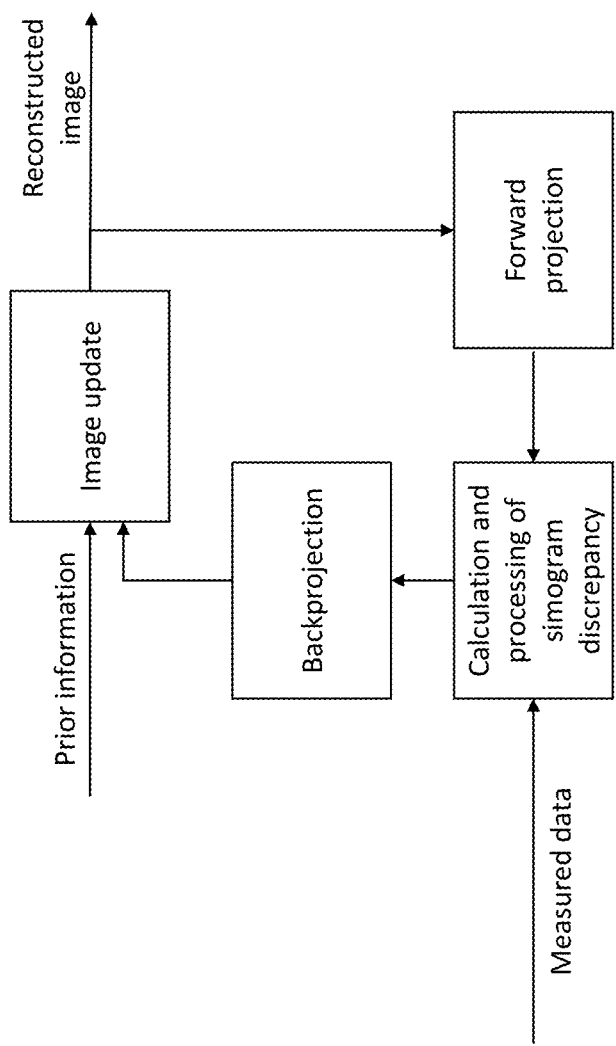
FIG. 4 is a schematic flow diagram illustrating a particular version of the proposed method.

In the first example reference is made to FIG. 4, where a flowchart of an exemplary implementation of an iterative reconstruction algorithm is shown. In each iteration, the measured data, or a processed version of the measured data, is compared with the forward projection of the current image estimate. Based on the discrepancy between these two sets of projection data, a back-projection step is used together with prior information about the expected content of the image to calculate an image update which is applied to the current image estimate to form a new image estimate. This procedure is iterated until a stopping criterion is fulfilled. Such an iterative reconstruction algorithm may exemplarily be used in the present invention for generating S2 first image data or for updating S3 the first image data to obtain second image data.

Figure 5:
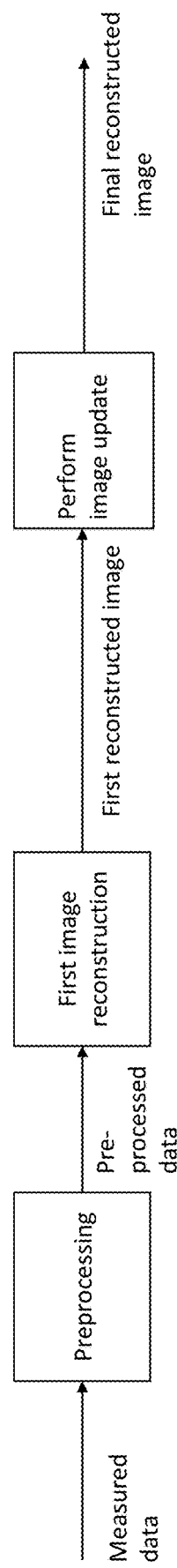
FIG. 5 is a schematic flow diagram illustrating another particular version of the proposed method.

In the second example reference is made to FIG. 5, where a flowchart of an exemplary implementation of the present invention is shown. Measured data is obtained from a photon-counting detector and processed to yield preprocessed data. Said preprocessed data is then used as input to a first reconstruction algorithm which is based on a first functional and generates a first reconstructed image as output. The first reconstructed image is then updated in an image update step, where the update is based on a second functional, thereby yielding a final reconstructed image.

Figure 6:
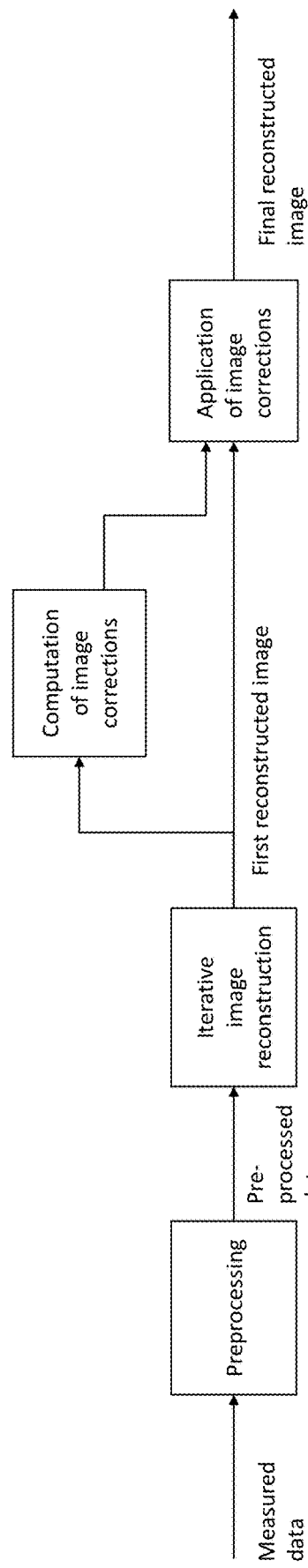
FIG. 6 is a schematic flow diagram illustrating still another particular version of the proposed method.

In the third example reference is made to FIG. 6, where a flowchart of a further exemplary implementation of the present invention is shown. Measured data is obtained from a photon-counting detector and processed to yield preprocessed data. The preprocessed data is then used as input to a first reconstruction algorithm which optimizes a first functional using an iterative algorithm and generates first reconstructed image data as output. Based on the first reconstructed image data and based on a second functional, which includes a model of one or more physical effects not included in the first functional, one or more image corrections is calculated. The image corrections are then applied to the first reconstructed image data to yield final reconstructed image data.

Having described various embodiments of the proposed method in detail, in what follows we will describe an image processing device configured to perform the proposed method. All advantages associated with the earlier describe method are applicable also to the image processing device.

Reference is now made to FIG. 1, where it is illustrated how an x-ray imaging system 100 comprising an image processing device 30 connected to an x-ray system 20 adapted for detecting x-rays transmitted from an x-ray source 20. The x-ray system provides the image processing device 30 with representations of the measured data. The representations may be any representation that is suitable as input in an image reconstruction process. The particular ways and representations are well known in the art.

According to a the proposed technology there is provided an image processing device 30 for reconstructing image data from x-ray data measured with an imaging system comprising at least one photon-counting detector. The image processing device 30 is configured to obtain a representation of data measured by the photon-counting detector. The image processing device 30 is also configured to generate first image data based on a projection based first functional using a first algorithm, the projection based first functional being dependent on the representation of data. The image processing device 30 is also configured to update, based on a second functional that includes a model of at least one physical effect not included in the projection based first functional, the first image data to obtain second image data.

According to a particular embodiment of the proposed technology there is provided an image processing device, wherein the image processing device is configured to generate first image data by using a first algorithm on the first functional where the first functional is a penalized weighted least squares functional.

According to another embodiment of the proposed technology there is provided an image processing device, wherein the image processing device is configured to generate first image data by using a first algorithm on the first functional where the first functional is a maximum likelihood or a maximum a posteriori functional.

According to yet another embodiment of the proposed technology there is provided an image processing device, wherein the first algorithm is a Newton method, an iterative coordinate descent method, a separable quadratic surrogates method, an expectation maximization method, a conjugate gradient method, an ordered subset method, or a combination of a plurality of the methods.

According to still another embodiment of the proposed technology there is provided an image processing device, wherein the processing device is configured to of update the first image data to obtain second image data by performing an image updating algorithm on the first functional when at least one term from the second functional has been added to the first functional, thereby yielding a perturbed first functional, the at least one term providing a model of at least one physical effect not included in the first functional.

By way of example, the proposed technology provides an image processing device that is configured to update the first image data by being configured to perform a series expansion of the optimum of the perturbed first functional as a function of the input data, with respect to at least one parameter determining the magnitude of at least one particular term in the second functional which is not present in the first functional, and configured to compute a correction to the first image data based on the series expansion, to thereby obtain second image data.

A possible embodiment of the proposed image processing device provides an image processing device wherein the second algorithm is a Newton method, an iterative coordinate descent method, a separable quadratic surrogates method, an expectation maximization method, a conjugate gradient method, an ordered subset method, or a combination of a plurality of the methods.

A possible embodiment of the proposed technology provides an image processing device that is configured to compute the value of the second functional when the second functional:
a) depends on the first image data, and
b) depends on the second image data.

The image processing device is also configured to compare the computed values and select, based on the comparison, image data to be used as reconstructed image data.

Yet another embodiment of the proposed technology provides an image processing device that is configured to use the selected image data as input in an updating scheme for updating the reconstructed image data.

According to a particular example of the proposed technology there is provided an image processing device that is configured to compute the value of the second functional by being configured to compute an estimate of the value of the second functional by performing at least one step in an algorithm.

By way of example, the proposed technology provides an image processing device that is configured to select the image data to be used as input by selecting the image data that yields the lowest or the highest value for the second functional.

A particular embodiment of the proposed technology provides an image processing device wherein the physical effect is one of the following, or a combination thereof: Poisson noise statistics, optical blur, pile-up, detector element cross-talk and object scatter.

A preferred embodiment of the proposed technology provides an image processing device wherein the first image data comprises at least one basis material image.

Figure 8:
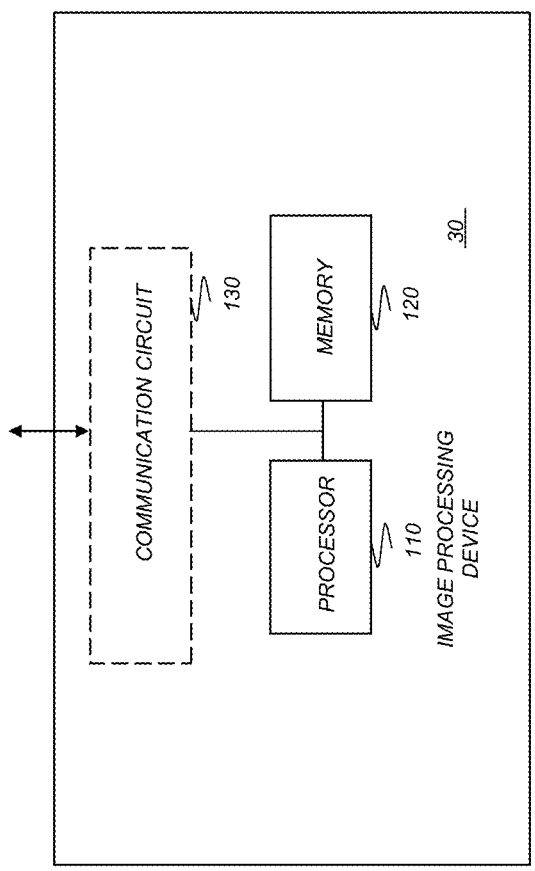
FIG. 8 is a diagram illustrating a particular embodiment of an image processing device according to the proposed technology.

Reference is now made to FIG. 8 where it is illustrated a schematic block diagram of an image processing device 30, based on a processor-memory implementation according to an embodiment. In this particular example, the image processing device comprises at least one processor 110 and memory 120, the memory 120 comprising instructions, which when executed by the at least one processor 110, cause the at least one processor 110 to reconstruct image data from x-ray data measured with an imaging system comprising at least one photon-counting detector.

Optionally, the arrangement 100 may also include a communication circuit 130. The communication circuit 130 may include functions for wired and/or wireless communication with other devices and/or network nodes in the network. In a particular example, the communication circuit 130 may be based on radio circuitry for communication with one or more other nodes, including transmitting and/or receiving information. The communication circuit 130 may be interconnected to the processor 110 and/or memory 120. By way of example, the communication circuit 130 may include any of the following: a receiver, a transmitter, a transceiver, input/output (I/O) circuitry, input port(s) and/or output port(s). FIG. 8 also provides a schematic illustration of an image processing device 30 that comprises a communication circuitry 130.

Alternatively, or as a complement, the arrangement may be based on a hardware circuitry implementation. Particular examples of suitable hardware circuitry include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG) and/or memory units (MEM).

It is also possible to provide a solution based on a combination of hardware and software. The actual hardware-software partitioning can be decided by a system designer based on a number of factors including processing speed, cost of implementation and other requirements.

Figure 7:
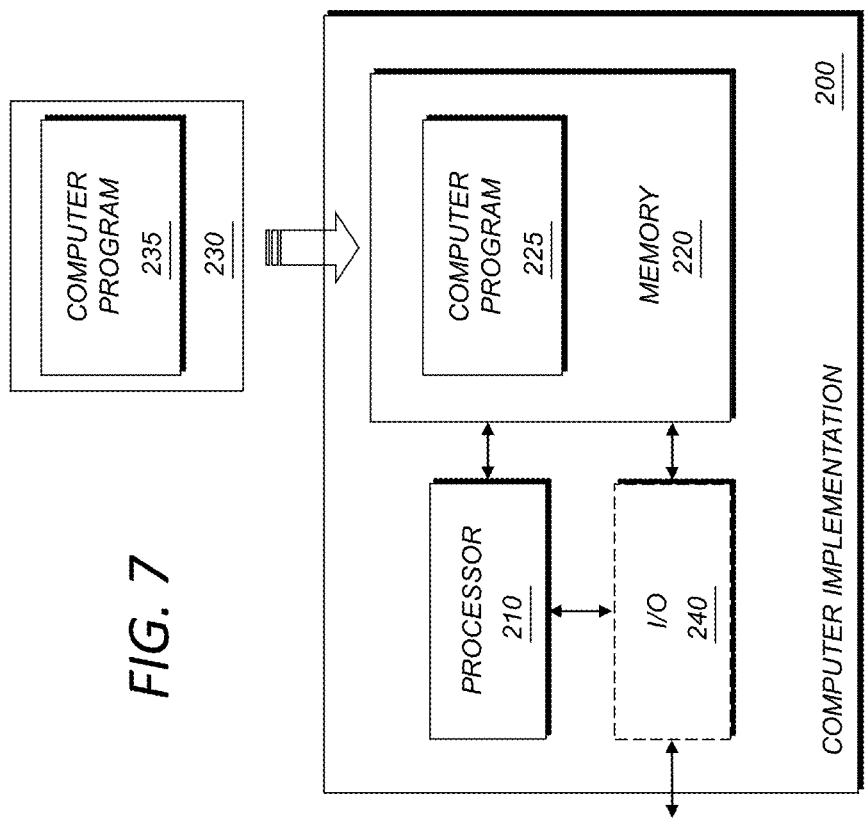
FIG. 7 is a diagram illustrating a computer program implementation according to the proposed technology.

FIG. 7 is a schematic diagram illustrating an example of a computer-implementation 200 according to an embodiment. In this particular example, at least some of the steps, functions, procedures, modules and/or blocks described herein are implemented in a computer program 225; 235, which is loaded into the memory 220 for execution by processing circuitry including one or more processors 210. The processor(s) 210 and memory 220 are interconnected to each other to enable normal software execution. An optional input/output device 240 may also be interconnected to the processor(s) 210 and/or the memory 220 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 210 is thus configured to perform, when executing the computer program 225, well-defined processing tasks such as those described herein.

The processing circuitry does not have to be dedicated to only execute the above-described steps, functions, procedure and/or blocks, but may also execute other tasks.

In a particular embodiment, the computer program is adapted to reconstruct image data from x-ray data measured with an imaging system comprising at least one photon-counting detector and comprises instructions, which when executed by at least one processor, cause the processor(s) to:

read a representation of data measured by a photon-counting detector of an x-ray imaging system;

generate first image data based on a first functional using a first algorithm, the first functional being dependent on the representation of data;

update, based on a second functional that includes a model of at least one physical effect not included in the first functional, the first image data to obtain second image data.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

Hence, there is provided a computer-program product comprising a computer-readable medium 220; 230 having stored thereon a computer program 225; 235.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

The invention claimed is:

1. A method of reconstructing image data from x-ray data measured with an imaging system including at least one photon-counting detector, the method comprising:

obtaining a representation of data measured by said at least one photon-counting detector, the representation comprising tomographic x-ray data measured with the imaging system comprising the at least one photon-counting detector;

generating first image data comprising at least one basis material image by optimizing a projection-based first functional using a first optimization algorithm, said projection-based first functional being dependent on said representation of data; and updating, based on a second functional that comprises terms modelling at least one physical effect not included in said projection based first functional, said first image data to obtain second image data, the updating comprising performing an image updating algorithm on the first functional when at least one term from the second functional has been added to the first functional, the at least one term providing a model of at least one physical effect included in the second functional but not included in the first functional, the physical effect being one or more of: optical blur, pile-up, detector element cross-talk, and object scatter.

2. The method according to claim 1, wherein the generating first image data comprises using the first algorithm on said first functional, said first functional being a penalized weighted least squares functional.

3. The method according to claim 1, wherein the generating first image data comprises using the first algorithm on said first functional, said first functional being a maximum likelihood or a maximum a posteriori functional.

4. The method according to claim 1, wherein said first algorithm is a Newton method, an iterative coordinate descent method, a separable quadratic surrogates method, an expectation maximization method, a conjugate gradient method, an ordered subset method, or a combination of a plurality of said methods.

5. The method according to claim 1, wherein the updating said first image data comprises performing a series expansion of the optimum of said first functional when at least one term from said second functional has been added to said first functional, said series expansion being done with respect to at least one parameter determining the magnitude of at least one particular term from said second functional and computing, based on said series expansion, an update of said first image data to thereby obtain second image data.

6. The method according to claim 1, wherein said second algorithm is a Newton method, an iterative coordinate descent method, a separable quadratic surrogates method, an expectation maximization method, a conjugate gradient method, an ordered subset method, or a combination of a plurality of said methods.

7. The method according to claim 1, further comprising: computing the value of said second functional when said second functional:
   a) depends on said first image data, and
   b) depends on said second image data, and comparing the computed values, and
   selecting, based on said comparison, image data to be used as reconstructed image data.

8. The method according to claim 7, wherein said selected image data is used as input in an updating scheme for updating said reconstructed image data.

9. The method according to claim 7, wherein the computing the value of said second functional comprises computing an estimate of the value of said second functional by performing at least one step in an algorithm.

10. The method according to claim 8, wherein the selecting the image data to be used as input comprises selecting the image data that yields the lowest value or the highest value for said second functional.

11. An image processing device for reconstructing image data from x-ray data measured with an imaging system including at least one photon-counting detector, wherein:
   the image processing device is configured to obtain a representation of data measured by said at least one photon-counting detector, the representation comprising tomographic x-ray data measured with the imaging system comprising the at least one photon-counting detector;
   the image processing device is configured to generate first image data comprising at least one basis material image by optimizing a projection-based first functional using a first optimization algorithm, said projection-based first functional being dependent on said representation of data; and
   the image processing device is configured to update, based on a second functional that comprises terms modelling at least one physical effect not included in said projection based first functional, said first image data to obtain second image data, the processing device being configured to update the first image data to obtain second image data by performing an image updating algorithm on the first functional when at least one term from the second functional has been added to the first functional, the at least one term providing a model of at least one physical effect included in the second functional but not included in the first functional, the physical effect being one or more of: optical blur, pile-up, detector element cross-talk, and object scatter.

12. The image processing device according to claim 11, wherein the image processing device is configured to generate the first image data by using the first algorithm on said first functional, said first functional being a penalized weighted least squares functional.

13. The image processing device according to claim 11, wherein the image processing device is configured to generate the first image data by using the first algorithm on said first functional, said first functional being a maximum likelihood or a maximum a posteriori functional.

14. The image processing device according to claim 11, wherein said first algorithm is a Newton method, an iterative coordinate descent method, a separable quadratic surrogates method, an expectation maximization method, a conjugate gradient method, an ordered subset method, or a combination of a plurality of said methods.

15. The image processing device according to claim 11, wherein the image processing device is configured to update said first image data by performing a series expansion of the optimum of said first functional when at least one term from said second functional has been added to said first functional, said series expansion being done with respect to at least one parameter determining the magnitude of at least one particular term from said second functional, and configured to compute, based on said series expansion, an update of said first image data to thereby obtain second image data.

16. The image processing device according to claim 11, wherein said second algorithm is a Newton method, an iterative coordinate descent method, a separable quadratic surrogates method, an expectation maximization method, a conjugate gradient method, an ordered subset method, or a combination of a plurality of said methods.

17. The image processing device according to claim 11, wherein:
   the image processing device is configured to compute the value of said second functional when said second functional:
   a) depends on said first image data, and
   b) depends on said second image data, and
   the image processing device is configured to compare the computed values, and
   the image processing device is configured to select, based on said comparison, image data to be used as reconstructed image data.

18. The image processing device according to claim 17, wherein the image processing device is configured to use said selected image data as input in an updating scheme for updating said reconstructed image data.

19. The image processing device method according to claim 17, wherein the image processing device is configured to compute the value of said second functional by being configured to compute an estimate of the value of said second functional by performing at least one step in an algorithm.

20. The image processing device according to claim 18, wherein the image processing device is configured to select the image data to be used as input by selecting the image data that yields the lowest value or the highest value for said second functional.

21. The image processing device according to claim 11, wherein said image processing device comprises at least one processor and memory, the memory comprising instructions, which when executed by the at least one processor, cause the at least one processor to reconstruct image data from x-ray data measured with an imaging system comprising at least one photon-counting detector.

22. The image processing device according to claim 11, wherein said image processing device comprises a communication circuitry.

23. A non-transitory computer program product, configured to reconstruct image data from x-ray data measured with an imaging system including at least one photon-counting detector, said non-transitory computer program product comprising instructions, which when executed by at least one processor, cause the at least one processor to:

read a representation of data measured by the at least one photon-counting detector of the x-ray imaging system, the representation comprising tomographic x-ray data measured with the imaging system comprising the at least one photon-counting detector;

generate first image data comprising at least one basis material image by optimizing a first functional using a first optimization algorithm, said first functional being dependent on said representation of data; and update, based on a second functional that includes a model of at least one physical effect not included in said first functional, said first image data to obtain second image data, the updating comprising performing an image updating algorithm on the first functional when at least one term from the second functional has been added to the first functional, the at least one term providing a model of at least one physical effect included in the second functional but not included in the first functional, the physical effect being one or more of: optical blur, pile-up, detector element crosstalk, and object scatter.

\* \* \* \* \*